(12) United States Patent
Wei

(10) Patent No.: US 10,721,192 B2
(45) Date of Patent: Jul. 21, 2020

(54) VISUAL MEDIA FILE TRANSMISSION METHOD AND USER TERMINAL

(71) Applicant: TENCENT TECHNOLOGY (SHENZHEN) COMPANY LIMITED, Shenzhen (CN)

(72) Inventor: Chao Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 98 days.

(21) Appl. No.: 16/016,564

(22) Filed: Jun. 23, 2018

(65) Prior Publication Data

US 2018/0309704 A1    Oct. 25, 2018

Related U.S. Application Data

(63) Continuation of application No. PCT/CN2017/075399, filed on Mar. 2, 2017.

(30) Foreign Application Priority Data

Mar. 4, 2016 (CN) .......................... 2016 1 0124482

(51) Int. Cl.
G06F 15/16 (2006.01)
H04L 12/58 (2006.01)

(52) U.S. Cl.
CPC ............ H04L 51/063 (2013.01); H04L 51/04 (2013.01); H04L 51/10 (2013.01); H04L 51/38 (2013.01)

(58) Field of Classification Search
CPC ....... H04L 51/063; H04L 51/04; H04L 51/10; H04L 51/38

(Continued)

(56) References Cited

U.S. PATENT DOCUMENTS 6,628,823 B1 * 9/2003 Holm .................. H04N 1/4072
                                                                            348/582
8,874,645 B2 * 10/2014 Espelien ................ H04N 7/173
                                                                            709/204

(Continued)

FOREIGN PATENT DOCUMENTS

CN    105243638 A    1/2016
CN    105681169 A    6/2016

OTHER PUBLICATIONS

The World Intellectual Property Organization (WIPO) International Search Report for PCT/CN2017/075399 dated Jun. 7, 2017 5 Pages (including translation).

Primary Examiner — Bharat Barot
(74) Attorney, Agent, or Firm — Anova Law Group, PLLC

(57) ABSTRACT

Embodiments of the present disclosure provide a visual media file transmission method and a user terminal. The visual media file transmission method includes: monitoring a transmission request for a visual media file; extracting, when the transmission request is detected, according to a reference value, information related to the visual media file to obtain an analysis result. The information related to the visual media file includes content information of the visual media file and/or a communication message associated with the visual media file; and determining, based on the analysis result, whether to transmit an original version of the visual media file. Embodiments of the present disclosure aim at optimizing transmission of the visual media file and lowering the probability of repeated transmission of the visual media file.

18 Claims, 11 Drawing Sheets

(58) Field of Classification Search
USPC .................................. 709/204–206, 217–219
See application file for complete search history.

(56) References Cited

U.S. PATENT DOCUMENTS

| | | | |
|---|---|---|---|
| 9,262,596 B1* | 2/2016 | Steiner | G06F 21/10 |
| 10,412,429 B1* | 9/2019 | Lee | H04N 21/234 |
| 2007/0291105 A1* | 12/2007 | Cataldo | G06F 16/4393 |
| | | | 348/14.01 |
| 2014/0269270 A1 | 9/2014 | Wolcott et al. | |
| 2018/0239524 A1* | 8/2018 | Snibbe | G11B 27/34 |
| 2019/0306100 A1* | 10/2019 | Guthery | H04L 51/04 |

* cited by examiner

VISUAL MEDIA FILE TRANSMISSION METHOD AND USER TERMINAL

RELATED APPLICATION

The present application claims priority to PCT Application No. PCT/CN2017/075399, filed on Mar. 2, 2017, which claims priority to Chinese Patent Application No. 201610124482.0, entitled "VISUAL MEDIA FILE TRANSMISSION METHOD AND USER TERMINAL," filed with the Chinese Patent Office on Mar. 4, 2016. Both applications are incorporated by reference in their entirety.

FIELD OF THE TECHNOLOGY

The present disclosure relates to communication technology, and in particular, to a visual media file transmission method and a user terminal.

BACKGROUND OF THE DISCLOSURE

Message communication refers to a mechanism for implementing communication by sending a message. Message communication may be performed between two or more persons. In one example, message communication may be performed between two or more users by establishing a communication group or a communication session. The message communication can be through instant messaging (IM). In another example, the message communication can be through a short message service (SMS).

In a message communication session, there is often a demand for transmitting visual media files between users. For example, the visual media file may be media data that visually transfers information, such as a static image including a picture and a photo, or a dynamic image including a video, a recorded video, or an animated image.

SUMMARY

Embodiments of the present disclosure provide a visual media file transmission method and a user terminal to improve transmission of visual media file.

One aspect of the present disclosure provides a visual media file transmission method. The method includes: monitoring a transmission request for a visual media file; extracting, when the transmission request is detected, according to a reference value, information related to the visual media file to obtain an analysis result, the information related to the visual media file comprising: content information of the visual media file or a communication message associated with the visual media file; and determining, based on the analysis result, whether to transmit an original version of the visual media file.

Another aspect of the present disclosure provides a user terminal. The user terminal includes a message communication unit, configured to monitor a transmission request for visual media file; a transmission control unit, configured to extract, when the transmission request is detected, according to a reference value, information related to the visual media file to obtain an analysis result, and determine, based on the analysis result, whether to transmit an original version of the visual media file. The information related to the visual media file includes content information of the visual media file and/or a communication message associated with the visual media file.

Another aspect of the present disclosure provides a non-volatile computer readable computer storage medium. The non-volatile computer readable storage medium, storing computer readable instructions, when executed by one or more processors, the computer readable instructions perform the following operations: monitoring a transmission request for a visual media file; extracting, when the transmission request is detected, according to a reference value, information related to the visual media file to obtain an analysis result, the information related to the visual media file comprising: content information of the visual media file and/or a communication message associated with the visual media file; and determining, based on the analysis result, whether to transmit an original version of the visual media file.

DESCRIPTION OF EMBODIMENTS

Figure 1:
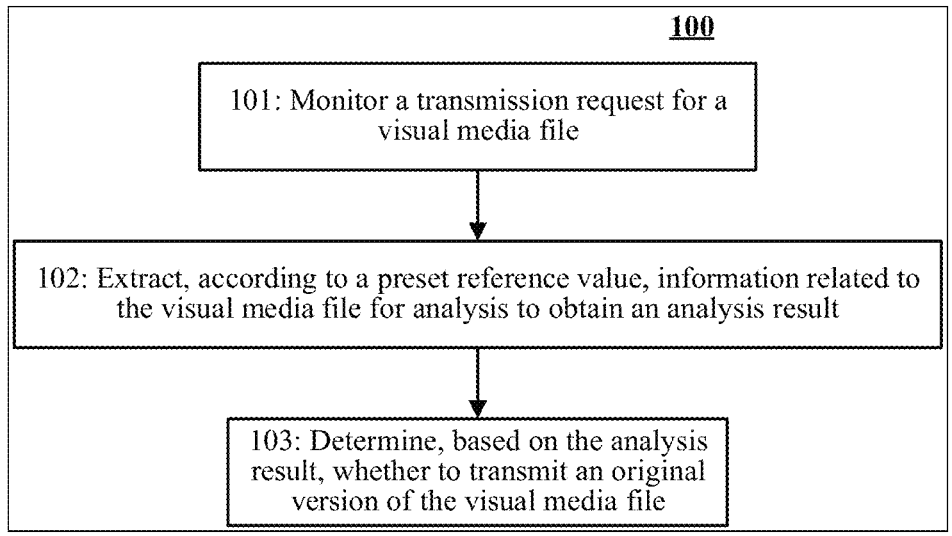
FIG. 1 is a schematic flowchart of a visual media file transmission method 100 according to an embodiment of the present disclosure.

To make the objectives, technical solutions, and advantages of the present disclosure clearer and more comprehensible, the following further describes the present disclosure in detail with reference to the accompanying drawings and by using examples.

In solutions provided in the embodiments of the present disclosure, whether an original version or a processed version of a visual media file is transmitted is determined by using a transmission control mechanism. Specifically, information related to the visual media file is extracted, according to a reference value, for analysis to obtain an analysis result. Different media file versions are correspondingly transmitted according to different analysis results. When the visual media file is transmitted, to reduce data traffic generated by the visual media file transfer, improve a response speed of data transmission, and save network resources, a user terminal performs data processing on the visual media file, to obtain the processed version of the visual media file. The processed version corresponds to the original version of the visual media file. In one example, the original version refers to visual media file originally stored on the user terminal, and the processed version refers to the visual media file after data deletion is performed on the original version. Usually, the file size of the processed version is smaller than that of the original version. In one example, the visual media file is a picture, and the processed version is obtained after cutting and compressing the original version, removing meta data related to the image taken time etc. from the original version, and the like. After the data processing, the file size of the picture is dramatically reduced, and the quality of the picture is correspondingly lowered. As a result, the picture may be unclear, for example, a human face in the picture cannot be clearly displayed.

Often when a group photo of multiple persons is sent, the processed version obtained through data deletion may have blurred human faces, although a user wants to send an original image, the user may miss checking an option for "original image". As a result, the user needs to re-send the original image. Consequently, two transmissions or multiples times of transmissions for a photo wastes data traffic and network resources. According to embodiments of the present disclosure, transmission of the visual media file can be optimized, and a probability of repeated transmission of the visual media file can be reduced. For example, in the embodiments of the present disclosure, a to-be-sent picture can be identified by using a human face detection technology. When it is found that when a quantity n of human faces in the picture exceeds a threshold t, a machine (that is, the user terminal) automatically checks the option of "original image" and further prompts the user whether the original image needs to be sent. That is, when automatically checking the option, the machine may further provide a selection opportunity for the user, thereby improving user experience. Further, a user behavior of whether the original image is finally selected is recorded and is uploaded to a cloud (such as a message communication server), so to dynamically adjust a threshold t according to whether automatic checking of the machine is consistent with reselection of the user, thereby improving accuracy of automatic checking of the machine. It should be noted that in embodiments of the present disclosure, "a user terminal" refers to a machine device, and "a user" refers to a person using the user terminal. Further, in embodiments of the present disclosure, a module or a unit may refer to one or more computer programs stored in one or more computer storage units, such as a computer memory unit. When executed by one or more processors the computer programs may implement the specific functions described in relation to each module or unit. A module or a unit may also refer to a combination of computer programs and hardware components. When executed by one or more processors, the computer programs, together with the hardware components, may implement the specific functions described in relation to each module or unit.

An embodiment of the present disclosure provides a visual media file transmission method 100, as shown in FIG. 1. In one embodiment of the present disclosure, the visual media file transmission method 100 is performed by a user terminal and includes the following operations.

Step 101: The user terminal monitors a transmission request for a visual media file.

In one embodiment of the present disclosure, the user terminal is an electronic device such as a smartphone, a tablet computer, a general-purpose computer, and a mobile communications device. In one embodiment of the present disclosure, a user using the user terminal sends the transmission request by clicking a key on a screen, and the screen clicking operation may be detected by a message communication instruction of the user terminal.

Step 102: The user terminal extracts, when the transmission request is detected, according to a reference value, information related to the visual media file for analysis to obtain an analysis result.

In one embodiment of the present disclosure, the information related to the visual media file may be content information of the visual media file and/or a communication message (for example, a communication message that is associated with the transmission request and that is in a message communication process) associated with the visual media file.

Step 103: The user terminal determines, based on the analysis result, whether to transmit an original version of the visual media file.

In this embodiment of the present disclosure, transmission of the visual media file, for example, whether to transmit an original version or a processed version of the visual media file, is controlled by setting a transmission control mechanism. In one embodiment of the present disclosure, the transmission control mechanism is a configuration file set by a server, and the reference value is recorded in the configuration file. The user terminal needs to obtain the configuration file from a message communication server, so as to extract the reference value from the configuration file and analyze the information related to the visual media file according to the reference value. In one embodiment of the present disclosure, the transmission control mechanism is a control logic (for example, a transmission control instruction) stored in the user terminal. In one embodiment of the present disclosure, the control logic is used for performing keyword filtering on the communication message that is associated with the transmission request and that is in the message communication process. In one embodiment of the present disclosure, the transmission control mechanism includes: the configuration file set by the server, the control logic stored in the user terminal, and the like.

Figure 2:
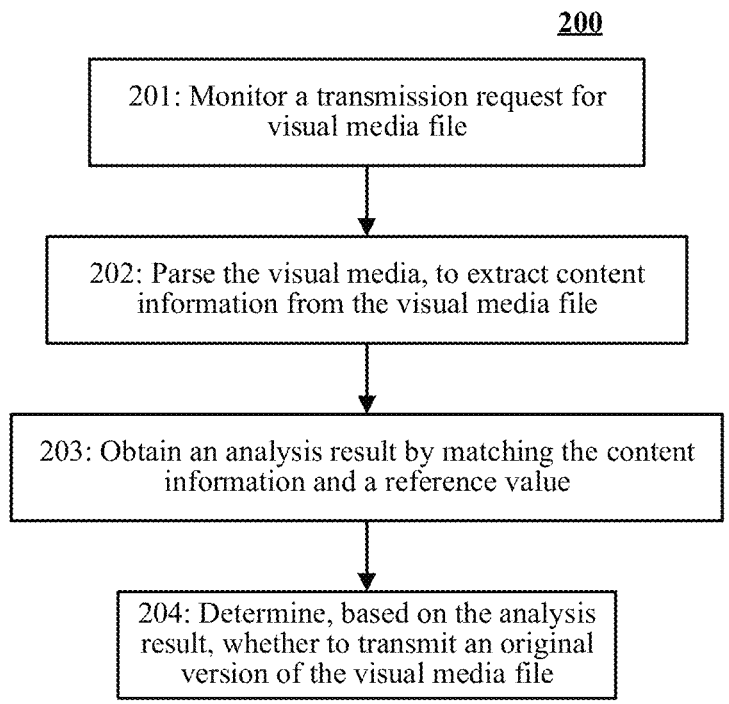
FIG. 2 is a schematic flowchart of a visual media file transmission method 200 according to an embodiment of the present disclosure.

FIG. 2 is a schematic flowchart of a visual media file transmission method 200 according to an embodiment of the present disclosure. In one embodiment of the present disclosure, the visual media file transmission method 200 includes the following operations.

Step 201: A user terminal monitors a transmission request for a visual media file.

Step 202: The user terminal parses the visual media file when the transmission request is detected, to extract content information of the visual media file from the visual media file.

In one embodiment of the present disclosure, the content information is information representing content such as features and attributes of the visual media file. For example, the content information may be identification information obtained after image recognition is performed on the visual media file. In one embodiment of the present disclosure, the user terminal performs human face detection on the visual media file, to obtain a quantity of human faces appearing in the visual media file. That is, the quantity of human faces is content information.

For another example, the content information may be photo-taking data or video-recording of the visual media file. In one embodiment of the present disclosure, the photo-taking data is exif information, that is, a series of data collected in a photo taking process. For example, the exif information may be a group of photo taking parameters, including: an aperture during photographing, a shutter, ISO, a date and a time, a camera brand and model, color coding, a sound recorded during the recording, Global Positioning System (GPS) information, and the like.

Step 203: The user terminal obtains an analysis result by matching the content information and a reference value.

In one embodiment of the present disclosure, the reference value is used as a reference of the content information, for example, for comparing the content information and the reference value or for performing content comparison on the content information and the reference value. Alternatively, an entry indicated by the reference value is extracted from the content information, and content comparison is performed on the entry and a communication message that is associated with the transmission request and that is in a message communication process.

Step 204: The user terminal determines, based on the analysis result, whether to transmit an original version of the visual media file.

Figure 3:
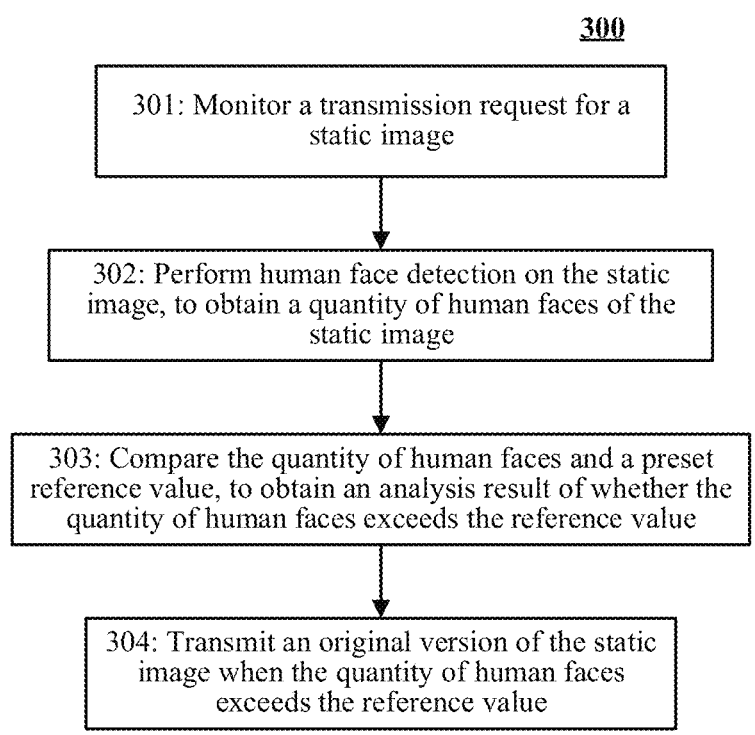
FIG. 3 is a schematic flowchart of a static image transmission method 300 according to an embodiment of the present disclosure.

FIG. 3 is a schematic flowchart of a static image transmission method 300 according to an embodiment of the present disclosure. The method 300 includes the following operations.

Step 301: A user terminal monitors a transmission request for a static image. In one embodiment of the present disclosure, the static image is a picture, a photo, and the like.

Step 302: The user terminal performs human face detection on the static image when the transmission request is detected, to obtain a quantity of human faces of the static image.

Step 303: The user terminal compares a reference value and the quantity of human faces, to obtain an analysis result of whether the quantity of human faces exceeds the reference value. In one embodiment of the present disclosure, exceeding means that the quantity of human faces is greater than the reference value. In one embodiment of the present disclosure, exceeding means that the quantity of human faces is greater than or equal to the reference value.

Step 304: The user terminal transmits an original version of the static image when the quantity of human faces exceeds the reference value. In one embodiment of the present disclosure, the reference value is five, that is, an original image, rather than a processed image, of a photo is to be transmitted when a quantity of human faces detected from the photo exceeds five.

Figure 4:
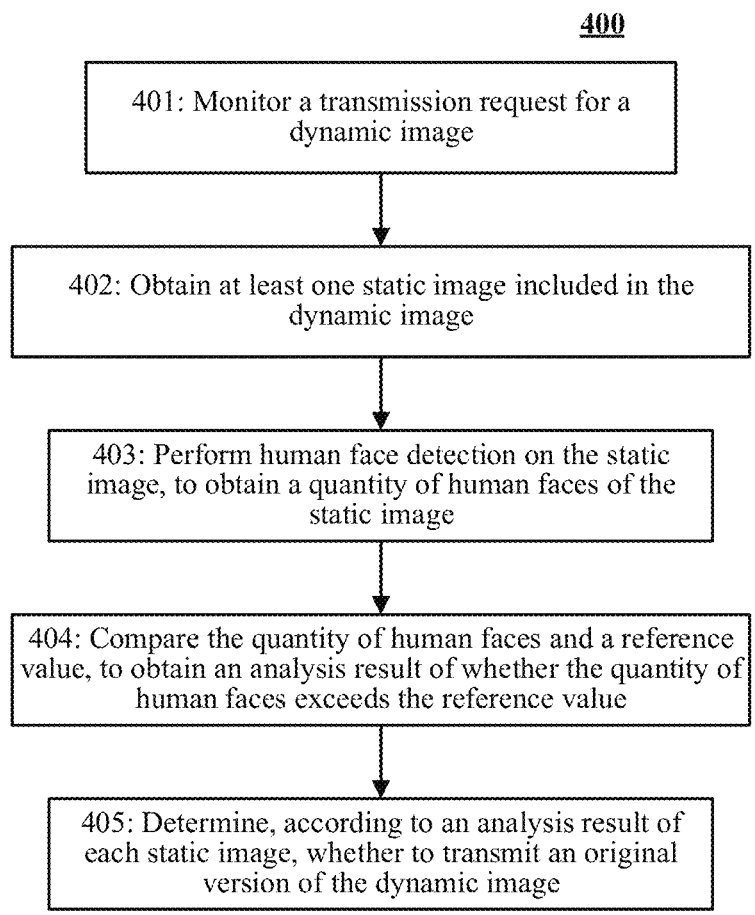
FIG. 4 is a schematic flowchart of a dynamic image transmission method 400 according to an embodiment of the present disclosure.

FIG. 4 is a schematic flowchart of a dynamic image transmission method 400 according to an embodiment of the present disclosure. The method 400 includes the following operations.

Step 401: A user terminal monitors a transmission request for a dynamic image. In one embodiment of the present disclosure, the dynamic image is a video, recorded video, an animated image, and the like.

Step 402: The user terminal obtains at least one static image included in the dynamic image when the transmission request is detected. In one embodiment of the present disclosure, the user terminal extracts one or more key frames from the dynamic image and may use a common key frame extraction algorithm.

Step 403: The user terminal performs human face detection on the static image, to obtain a quantity of human faces of the static image.

Step 404: The user terminal compares the quantity of human faces and a reference value, to obtain an analysis result of whether the quantity of human faces exceeds the reference value.

It should be noted that operations of steps 402 and 403 can be performed on each static image obtained from the dynamic image.

Step 405: The user terminal determines, according to an analysis result of each static image, whether to transmit an original version of the dynamic image.

In one embodiment of the present disclosure, when a quantity of human faces in a static image exceeds the reference value, the user terminal transmits the original version of the dynamic image. In one embodiment of the present disclosure, when static images whose quantity exceeds a specified quantity have human faces whose quantity exceeds the reference value, the user terminal transmits the original version of the dynamic image. For example, the user terminal obtains eight static images from the dynamic image, the reference value is 10, and the specified quantity is four. If the user terminal finally obtains through detection that there are six static images whose quantities of human faces are greater than 10, the original version is transmitted.

Figure 5:
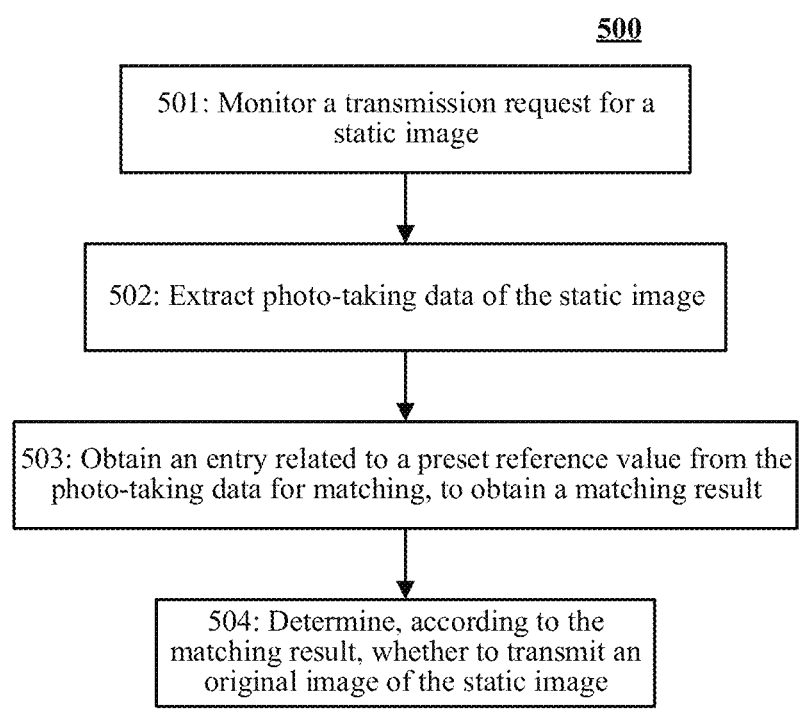
FIG. 5 is a schematic flowchart of a static image transmission method 500 according to an embodiment of the present disclosure.

FIG. 5 is a schematic flowchart of a static image transmission method 500 according to an embodiment of the present disclosure. The method 500 includes the following operations.

Step 501: A user terminal monitors a transmission request for a static image. In one embodiment of the present disclosure, the static image is a picture, a photo, and the like.

Step 502: The user terminal extracts photo-taking data of the static image when the transmission request is detected.

In step 503: The user terminal obtains an entry related to a reference value from the photo-taking data for analysis, to obtain a corresponding analysis result.

Step 504: The user terminal determines, according to the analysis result, whether to transmit an original image of the static image.

In one embodiment of the present disclosure, the user terminal obtains from the photo-taking data an entry of a type same as that of the reference value, and performs content comparison on the entry and the reference value, to obtain the analysis result of whether the entry is the same as the reference value. The original image of the static image is transmitted when the entry is the same as the reference value. In one embodiment of the present disclosure, value content of the reference value is a model (such as iPhone 5) of the user terminal, and an entry type thereof is "camera model". Correspondingly, a value of the entry type "camera model" is obtained from the photo-taking data. If value content thereof is also a model (such as iPhone 5) of the user terminal, it indicates that the static image is shot by the user terminal, and the original image may be sent.

In one embodiment of the present disclosure, value content of the reference value is "a photo-taking time" and "a photo-taking location", that is, it is specified by using the reference value that two entry types "a photo-taking time" and "a photo-taking location" need to be matched. Correspondingly, the user terminal obtains values of corresponding entry types from the photo-taking data, respectively, an actual photo-taking time of the static image and a geographic location in which photo-taking takes place. In addition, the user terminal further obtains one or more communication messages from a message communication process associated with the transmission request for semantic parsing, and extracts two pieces of content, a time and a location, from the messages. The user terminal compares the time and location extracted from the messages with "a photo-taking time" and "a photo-taking location" obtained from the photo-taking data, and transmits the original image of the static image if the time and location extracted from the messages and "a photo-taking time" and "a photo-taking location" obtained from the photo-taking data are matched. It should be noted that because a semantic parsing operation is relatively complex, the user terminal may send the corresponding messages to a message communication server for needed semantic parsing, and then receive a semantic parsing result provided by the message communication server. In one embodiment of the present disclosure, message content obtained by the user terminal is "a photo on the Xiangshan Mountain yesterday morning", and the semantic parsing result is "yesterday morning" and "Xiangshan". Correspondingly, the user terminal compares "yesterday morning" and "a photo-taking time", compares "the Xiangshan Mountain" and "a photo-taking location", and determines, according to the above, whether to transmit the original image of the static image.

Figure 6:
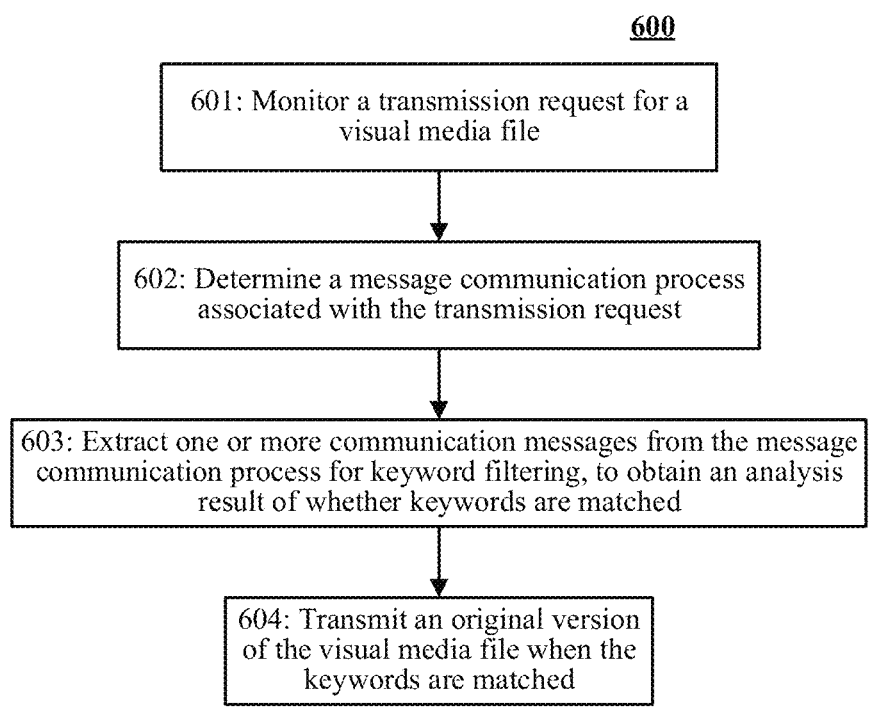
FIG. 6 is a schematic flowchart of a visual media file transmission method 600 according to an embodiment of the present disclosure.

FIG. 6 is a schematic flowchart of a visual media file transmission method 600 according to an embodiment of the present disclosure. In one embodiment of the present disclosure, the visual media file transmission method 600 includes the following operations.

Step 601: A user terminal monitors a transmission request for a visual media file. In one embodiment of the present disclosure, the visual media file may be a static image, a dynamic image, and the like.

Step 602: The user terminal determines, when the transmission request is detected, a message communication process associated with the transmission request. In one embodiment of the present disclosure, the user terminal sends the transmission request in a communication group, and the message communication process is a session process of the communication group.

Step 603: The user terminal extracts one or more communication messages from the message communication process for keyword filtering, to obtain an analysis result of whether keywords are matched.

Step 604: The user terminal transmits an original version of the visual media file when the keywords are matched.

In one embodiment of the present disclosure, the user terminal may obtain a message whose time interval with the transmission request is within a threshold for keyword filtering. In one embodiment of the present disclosure, the user terminal may obtain a predetermined quantity of messages before the transmission request is sent for keyword filtering. In one embodiment of the present disclosure, the user terminal may obtain a predetermined quantity of messages after the transmission request is sent for keyword filtering. In this case, transmission of the visual media file has a delay of a degree after the transmission request is sent. In one embodiment of the present disclosure, the reference value in step 102 is a keyword used for filtering message content, and the keyword may be set according to a transmission control demand. In one embodiment of the present disclosure, the keyword may be an occasion involving relatively many persons such as "a group photo", "graduation", "a party", and "a wedding".

Figure 7:
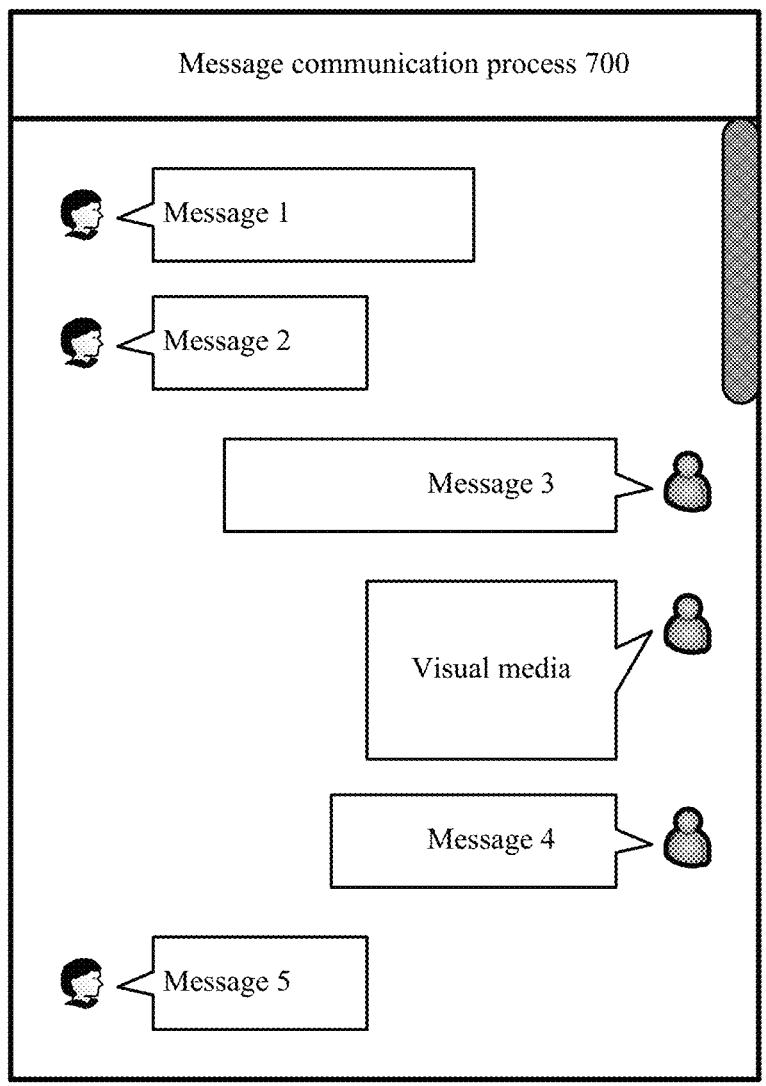
FIG. 7 is a schematic diagram of an interface of a message communication process 700 according to an embodiment of the present disclosure.

FIG. 7 is a schematic diagram of an interface of a message communication process 700 according to an embodiment of the present disclosure and shows a part of a chat history. In FIG. 7, a transmission request of visual media file is sent by a user 1, and a message 3 and a message 4 are also sent by the user 1. Messages 1, 2, and 5 are sent by other users. For example, a keyword may be "a party".

In one example, the user terminal obtains messages within two seconds before and after the transmission request. The messages in the example are the messages 3 and 4, and content of the message 3 just includes "a party". Because the keyword is "a party", the user terminal determines, according to the messages 3 and 4, that an original version of the visual media file needs to be transmitted.

In one example, the user terminal obtains three messages before the transmission request is sent. The messages in the example are the messages 1-3, and content of the message 3 just includes "a party". That is, the user terminal determines, according to the messages 1-3, that the original version of the visual media file needs to be transmitted. In one example, the user terminal obtains two messages after the transmission request is sent. The messages in the example are the messages 4 and 5, and content of the message 5 just includes "a party". That is, the user terminal determines, according to the messages 4 and 5, that the original version of the visual media file needs to be transmitted. For a situation of performing determining by using the messages after the transmission request, sending of the visual media file needs to be delayed.

Figure 8:
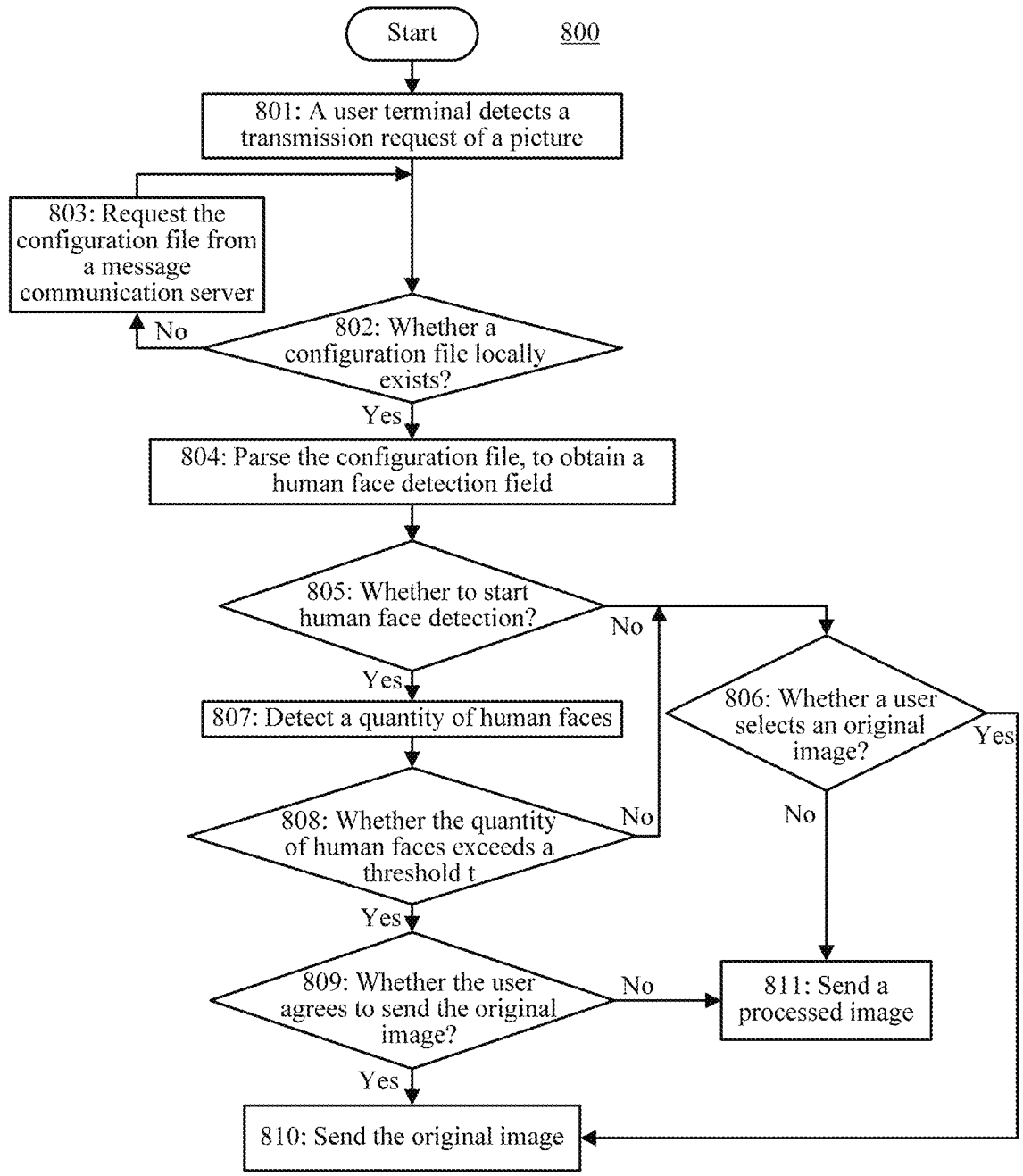
FIG. 8 is a schematic flowchart of a visual media file transmission method 800 according to an embodiment of the present disclosure.

FIG. 8 is a schematic flowchart of a visual media file transmission method 800 according to an embodiment of the present disclosure. In one embodiment of the present disclosure, the visual media file transmission method 800 includes the following operations.

Step 801: A user terminal detects, after a user selects a to-be-sent picture, a transmission request of the picture.

Step 802: The user terminal determines whether a configuration file locally exists. Step 803 is performed if the configuration file does not exist. Step 804 is performed if the configuration file exists.

The configuration file is used for controlling transmission of the picture. In one embodiment of the present disclosure, the configuration file includes a threshold field, and a value thereof is t. In one embodiment of the present disclosure, the configuration file includes a human face detection field. In one embodiment of the present disclosure, the configuration file includes a version field. A version field is used for indicating a version number of the configuration file. A face detect field is used for indicating whether human face detection is started at the user terminal, and a value true represents "start". A threshold field is used for instructing to send the threshold t of an original image. In one embodiment of the present disclosure, the configuration file is any combination of a threshold field, a human face detection field, and a version field.

In one embodiment of the present disclosure, implementations of the configuration file are as follows. The configuration file includes three fields, the version field, face detect field, and threshold field.

```
{
"version": 1,
"face_detect": true,
"threshold": 3
}
```

Step 803: The user terminal requests the configuration file from a message communication server, and step 802 is performed.

In one embodiment of the present disclosure, the configuration file is stored in a configuration file database of the message communication server. In one embodiment of the present disclosure, because a calculated amount required by execution of human face detection is high, there is a requirement on hardware configuration of the user terminal. Therefore, it needs to be decided by the server whether to start a detection function at the user terminal, and a decision of the server is recorded in the human face detection field to inform the user terminal.

Step 804: The user terminal parses the configuration file, to obtain a human face detection field.

In one embodiment of the present disclosure, after receiving the configuration file, the user terminal may further compare the version number recorded in the version field and a local version number. The locally stored configuration file is updated when the recorded version number is higher than the local version number.

Step 805: The user terminal determines, according to the human face detection field, whether to start human face detection. Step 806 is performed if human face detection is started. Step 807 is performed if human face detection is not started.

Step 806: Determine whether the user selects an original image of the picture. Step 810 is performed if the user selects the original image of the picture. Step 811 is performed if the user does not select the original image of the picture.

Step 807: The user terminal detects a quantity n of human faces.

Step 808: The user terminal determines whether the quantity n of human faces exceeds a threshold t. Step 809 is performed if the quantity n of human faces exceeds the threshold t. Step 806 is performed if the quantity n of human faces does not exceed the threshold t.

Step 809: The user terminal determines whether the user agrees to send the original image. Step 810 is performed if the user agrees to send the original image. Step 811 is performed if the user does not agree to send the original image.

Figure 9:
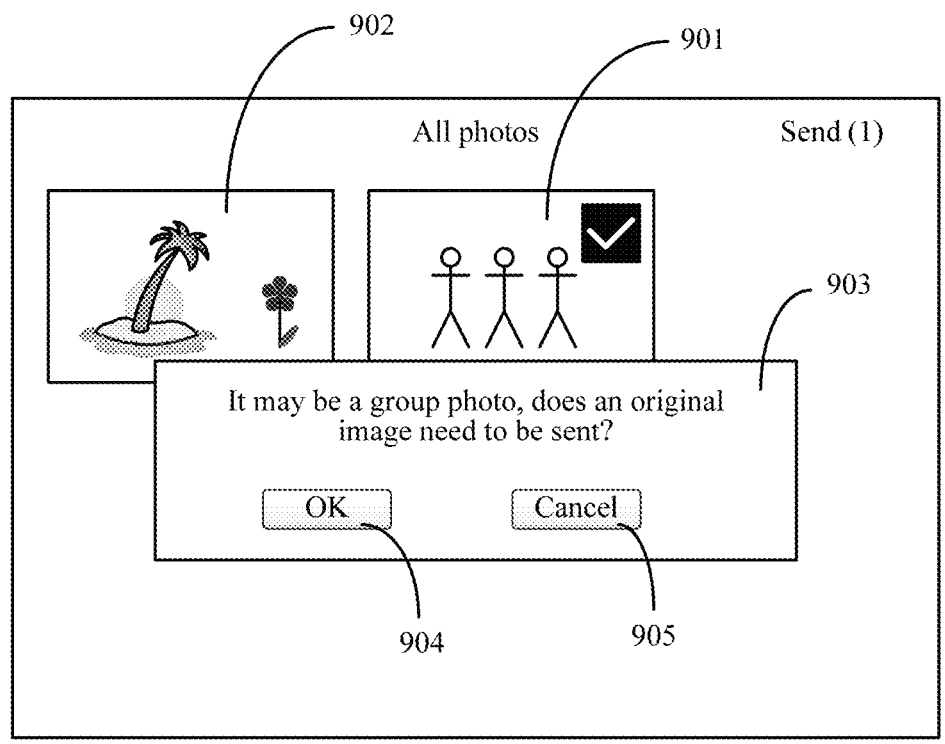
FIG. 9 is a schematic diagram of a user interface according to an embodiment of the present disclosure.

In one embodiment of the present disclosure, the user terminal may prompt the user in step 809 whether to send the original image (see FIG. 9 for the schematic diagram of the prompt interface) and performs picture transmission according to selection of the user. FIG. 9 includes a portrait image 901 and a scenery image 902. The user selects to send the portrait image 901, and then a prompt box 903 appears in the interface. In one embodiment of the present disclosure, content of the prompt box 903 is "It may be a group photo, does an original image need to be sent", and two option keys: an OK key 904 and a cancel key 905 are provided. The user presses down the OK key 904, which means that the user agrees to send the original image. The user presses down the cancel key 905, which means that the user thinks that the original image does not need to be sent at this moment, and the user terminal performs step 811.

Step 810: The user terminal sends the original image in a message communication process, and the process ends. It should be noted that step 810 makes other users in the message communication process see the clear original image.

Step 811: The user terminal processes the picture, to obtain a processed image and send the processed image, and the process ends.

In one embodiment of the present disclosure, when detecting a group photo of multiple persons, the user terminal checks an option of "original image" and prompts the user that this is a group photo. Whether the original image needs to be sent is stated in step 809. If the user terminal detects that the photo is not a group photo, or the quantity n of human faces is less than the threshold t, or the user selects to "cancel" sending the original image, the processed image is sent.

Further, the user terminal sends a determining result in step 809 to the message communication server, and the message communication server stores the determining result into a user behavior database, to modify the threshold field in the configuration file. In one embodiment of the present disclosure, the message communication server uses the determining result in step 809 as a user behavior for analysis. For example, a situation in which the quantity n of human faces exceeds the threshold t, and the user does not agree to send the original image means that the threshold t is unreasonably set, and the threshold t may need to be improved.

In one embodiment of the present disclosure, the operations in step 801 to step 811 may be performed by a transmission control instruction stored by the user terminal. Details are as follows.

```
public void sendImage(Image image){
if(!existConfigFile()){
requestConfigFile(hardwareInfo);
}
Config config = parseConfigFile();
boolean isSendRawImage = checkBox.isChecked();
if(config.faceDetect){
int faceCount = faceDetect(image);
if(faceCount >= config.threshold){
isSendRawImage = showTipsDialog ("It may be a group photo, does an original image need to be sent?");
reportUserSelection(faceCount, isSendRawImage);
}
}
if(isSendRawImage){
sendRawImage(image);
}else{
processAndSendImage(image);
}
}
```

In one embodiment of the present disclosure, the transmission control instruction receives a picture transmission request of the user and determines whether the configuration file is locally stored. When the configuration file does not locally exist, the transmission control instruction sends a configuration file request to the message communication server, and the configuration file request carries hardware information of the user terminal. After receiving the configuration file, the user terminal parses the configuration file, to obtain a corresponding file from the configuration file. In one embodiment of the present disclosure, the transmission control instruction determines whether the face detect field is true. Human face detection is executed if the face detect field is true, to obtain the quantity n of human faces. The transmission control instruction compares the quantity n of human faces and the threshold field. The transmission control instruction sets a check box of the original image to "selected" if the quantity n of human faces is greater than or equal to the threshold t. Further, when the quantity n of human faces is greater than or equal to the threshold t, the transmission control instruction displays a prompt box "It may be a group photo, does an original image need to be sent?" to the user and records a selection result of the user on the prompt box. Afterwards, the transmission control instruction sends a user report to the message communication server, and notifies the message communication server of user behaviors such as the quantity of human faces and the selection result. In one embodiment of the present disclosure, the selection result may be "not sending the original image" or "sending the original image". In one embodiment of the present disclosure, a key (similar to "a cancel key" 905) of "not sending the original image" is provided on the prompt box. When the user clicks the key, the transmission control instruction modifies the check box of the original image to "unselected". In one embodiment of the present disclosure, the message communication server calibrates the threshold t according to the received large quantity of user behaviors.

The foregoing method shown in FIG. 1 to FIG. 9 improves a visual media file transmission process and reduces a probability of retransmission of visual media file, thereby saving network bandwidth and data traffic and avoiding bandwidth waste caused by retransmission of the original version of the visual media file by the user to an extent.

Figure 10:
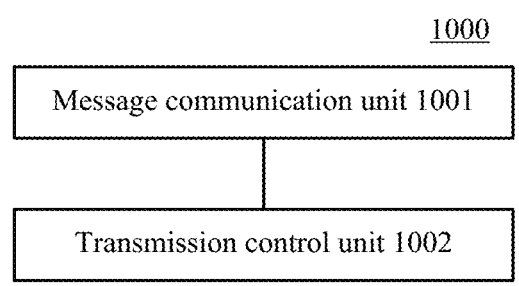
FIG. 10 is a schematic composition diagram of a user terminal 1000 according to an embodiment of the present disclosure.

FIG. 10 is a schematic composition diagram of a user terminal 1000 according to an embodiment of the present disclosure. In one embodiment of the present disclosure, the user terminal 1000 includes: a message communication unit 1001 and a transmission control unit 1002.

In one embodiment of the present disclosure, the message communication unit 1001 is configured to monitor a transmission request for a visual media file. The transmission control unit 1002 is configured to extract, when the transmission request is detected, according to a reference value, information related to the visual media file for analysis to obtain an analysis result, and determine, based on the analysis result, whether to transmit an original version of the visual media file. The information related to the visual media file includes: content information of the visual media file and/or a communication message associated with the visual media file. For operations of the transmission control unit 1002, refer to FIG. 1 to FIG. 9. In one embodiment of the present disclosure, the transmission control unit 1002 is further configured to: obtain from a message communication server a configuration file in which the reference value is recorded. In one embodiment of the present disclosure, the message communication unit 1001 is implemented by using a message communication instruction, and the transmission control unit 1002 is implemented by using a transmission control instruction.

Figure 11:
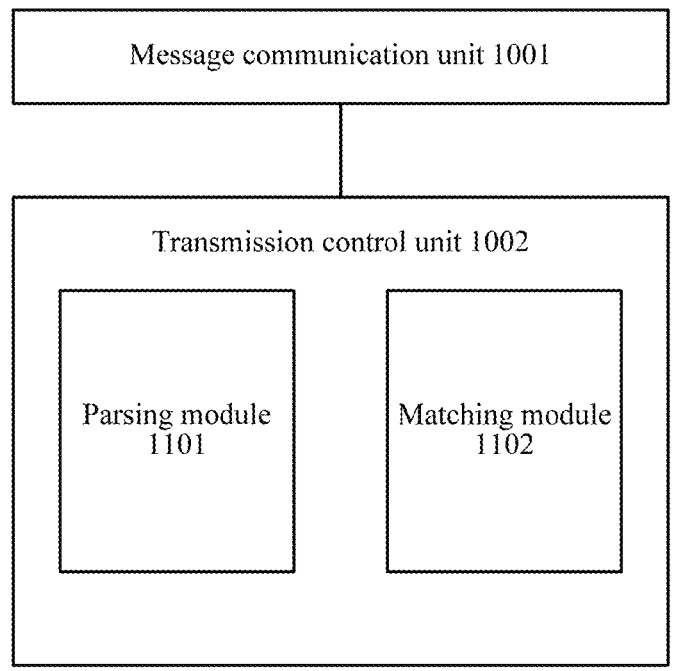
FIG. 11 is a schematic composition diagram of a user terminal 1100 according to an embodiment of the present disclosure.

FIG. 11 is a schematic composition diagram of a user terminal 1100 according to an embodiment of the present disclosure. In one embodiment of the present disclosure, the user terminal 1100 includes: a message communication unit 1001 and a transmission control unit 1002. The transmission control unit 1002 includes: a parsing module 1101 and a matching module 1102.

In one embodiment of the present disclosure, the parsing module 1101 is configured to parse the visual media file to extract the content information of the visual media file. The matching module 1102 is configured to obtain the analysis result by matching the content information and the reference value.

In one embodiment of the present disclosure, the parsing module 1101 is configured to: obtain at least one static image included in the visual media file, and perform image recognition on the static image, to obtain a quantity of human faces of the static image. The matching module 1102 is configured to: compare the quantity of human faces with the reference value, to obtain the analysis result of whether the quantity of human faces exceeds the reference value.

In one embodiment of the present disclosure, the parsing module 1101 is configured to: obtain at least one static image included in the visual media file, and extract photo-taking data of the static image. In one embodiment of the present disclosure, the matching module 1102 is configured to: obtain from the photo-taking data an entry of a type the same as that of the reference value, and perform content matching on the entry and the reference value, to obtain the analysis result of whether the entry and the reference value are matched. In one embodiment of the present disclosure, the matching module 1102 is configured to: obtain from the photo-taking data an entry indicated by the reference value, and perform content matching on the entry and the communication message that is associated with the visual media file and that is in a message communication process, to obtain the analysis result of whether the entry and the communication message that is associated with the visual media file and that is in the message communication process are matched.

Figure 12:
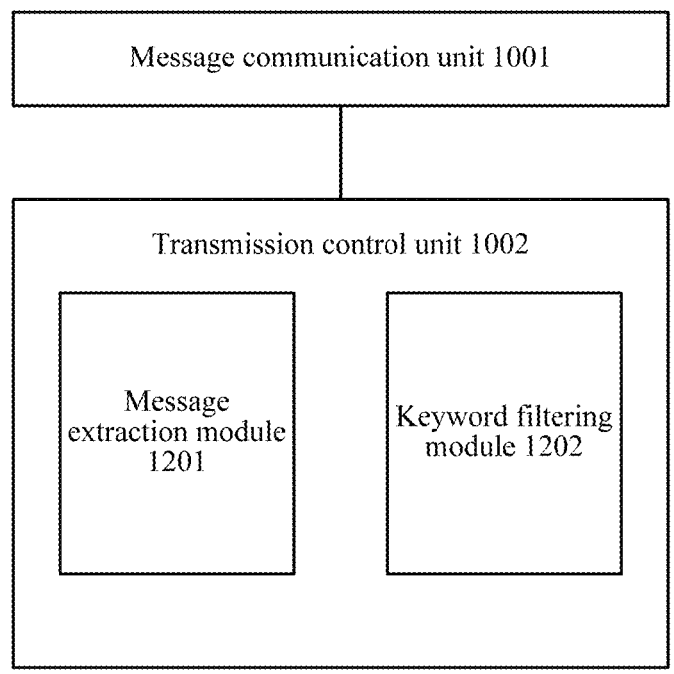
FIG. 12 is a schematic composition diagram of a user terminal 1200 according to an embodiment of the present disclosure.

FIG. 12 is a schematic composition diagram of a user terminal 1200 according to an embodiment of the present disclosure. In one embodiment of the present disclosure, the user terminal 1200 includes: a message communication unit 1001 and a transmission control unit 1002. The transmission control unit 1002 includes: a message extraction module 1201 and a keyword filtering module 1202.

In one embodiment of the present disclosure, the message extraction module 1201 is configured to determine a message communication process associated with the transmission request and extract one or more communication messages from the message communication process. The keyword filtering module 1202 is configured to perform keyword filtering on the extracted messages, to obtain the analysis result of whether keywords are matched. In one embodiment of the present disclosure, the message extraction module 1201 is configured to: obtain messages whose time intervals with the transmission request are within a threshold, or obtain a predetermined quantity of messages before and after the transmission request is sent.

Figure 13:
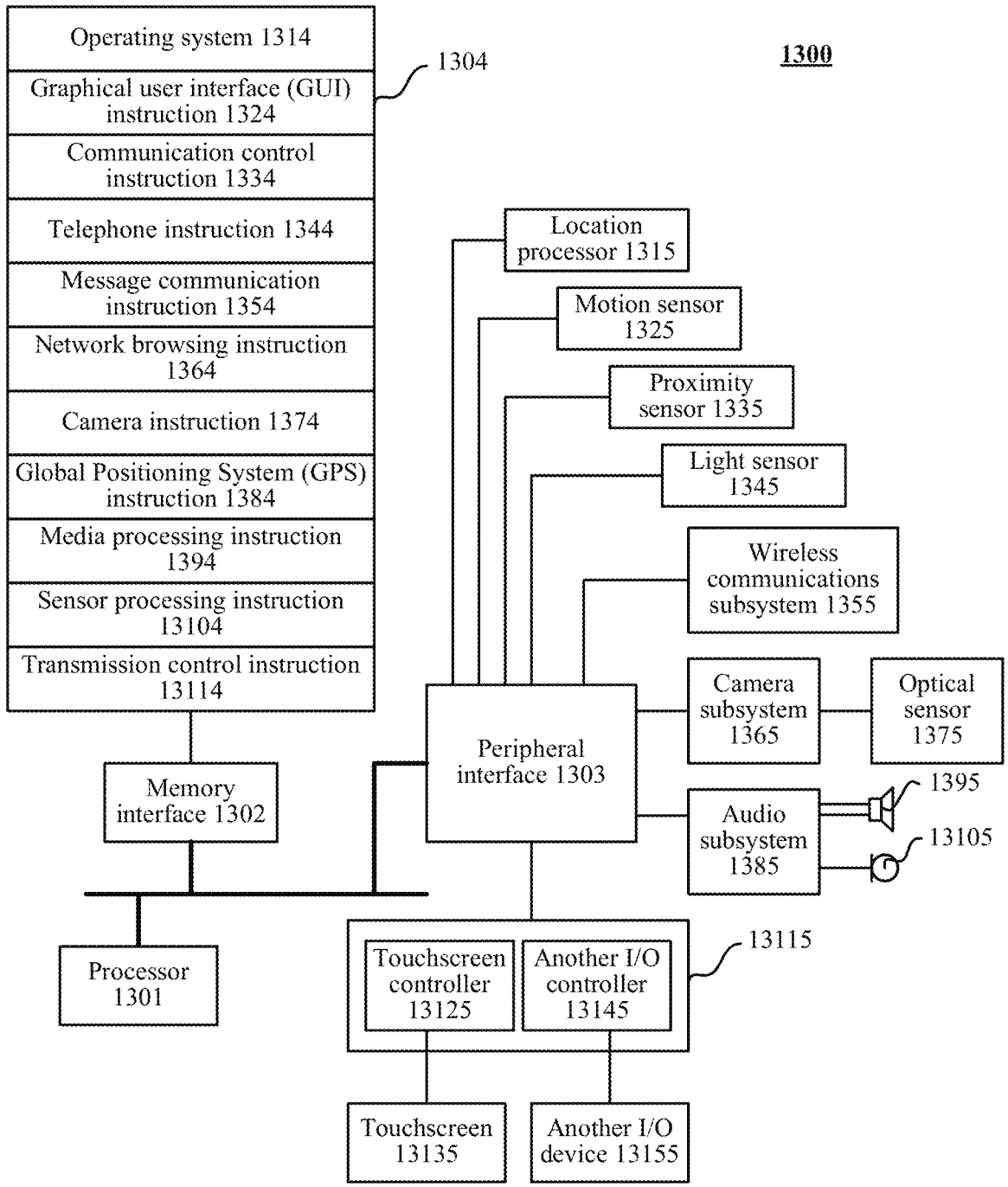
FIG. 13 is a schematic composition diagram of a mobile device 1300 according to an embodiment of the present disclosure.

FIG. 13 is a schematic structural diagram of a mobile device 1300 according to an embodiment of the present disclosure. In one embodiment of the present disclosure, the mobile device 1300 is the user terminal in FIG. 1 to FIG. 12. In one embodiment of the present disclosure, the mobile device 1300 includes: a processor 1301, a memory interface 1302, and a peripheral interface 1303. In one embodiment of the present disclosure, the processor 1301 includes: a data processor, an image processor, and the like. In one embodiment of the present disclosure, the processor 1301 includes: an application processor, a baseband processor, a wireless processor, and the like. In one embodiment of the present disclosure, the processor 1301, the memory interface 1302, and the peripheral interface 1303 may be discrete elements or may be integrated in a same integrated circuit. Constituent parts of the mobile device 1300 may be connected by using a communications bus, a signal line, or the like.

In one embodiment of the present disclosure, the mobile device 1300 further includes: a memory 1304 connected to the memory interface 1302. The memory 1304 includes: a random access memory (RAM) and/or a non-volatile memory. In one embodiment of the present disclosure, the non-volatile memory may be a magnetic disk storage apparatus, an optical storage apparatus, and/or a flash memory (such as an NAND and an NOR).

The memory 1304 stores an operating system 1314. In one embodiment of the present disclosure, the operating system 1314 may be an operating system such as LINUX, UNIX, Windows, iOS, or Android or may be an embedded real-time operation system (RTOS). In one embodiment of the present disclosure, the operating system 1314 includes a series of instructions for processing system basic services and executing hardware related tasks. In one embodiment of the present disclosure, the operating system 1314 includes a core (such as a UNIX core).

Specifically, in some embodiments of the present disclosure, the memory 1304 stores one or more programs, configured to be executed by one or more processors 1301.

The one or more programs may include the following instruction units: a message communication unit 1001, configured to monitor a transmission request for a visual media file; and a transmission control unit 1002, configured to extract, when the transmission request is detected, according to a reference value, information related to the visual media file for analysis to obtain an analysis result, and determine, based on the analysis result, whether to transmit an original version of the visual media file.

The units in the foregoing embodiments may also be instruction units and be included in the memory 1304.

In one embodiment of the present disclosure, the memory 1304 further stores the following one or more segments of instructions: a graphical user interface (GUI) instruction 1324, a communication control instruction 1334, a telephone instruction 1344, a message communication instruction 1354, a network browsing instruction 1364, a camera instruction 1374, a GPS instruction 1384, a media processing instruction 1394, and a sensor processing instruction 13104.

The GUI instruction 1324 is used for processing a GUI. The communication control instruction 1334 is used for implementing communication between the mobile device 1300 and a computer, a server, and/or other mobile devices. The telephone instruction 1344 is used for implementing processing and functions related to calling. The message communication instruction 1354 is used for implementing processing and functions related to electronic message transmission. The network browsing instruction 1364 is used for implementing processing and functions related to network browsing and access. The camera instruction 1374 is used for implementing processing and functions related to a camera. The GPS instruction 1384 is used for implementing functions related to location processing such as positioning and navigation. In one embodiment of the present disclosure, the media processing instruction 1394 is used for implementing functions related to media processing. Further, the media processing instruction 1394 may be divided into an audio processing instruction, a video processing instruction, and the like. The audio processing instruction is used for processing audio data (such as content such as music and a voice), and the video processing instruction is used for processing video data (content such as a picture, an image, and a video). The sensor processing instruction 13104 is used for implementing processing and functions related to a sensor.

In one embodiment of the present disclosure, the memory 1304 may further store other instructions, such as a security management instruction and an online shopping instruction, so that the mobile device 1300 can implement more functions. The security management instruction is used for managing access security of the mobile device 1300, and the online shopping instruction is used for implementing processing and functions related to online shopping.

In one embodiment of the present disclosure, the memory 1304 stores a transmission control instruction 13114, and execution of the transmission control instruction 13114 makes the processor 1301 perform operations shown in FIG. 1 to FIG. 12.

The peripheral interface 1303 may be connected to a sensor, various apparatuses, a sub-system, and the like, to implement various expansion functions. In one embodiment of the present disclosure, the peripheral interface 1302 may be connected to a location processor 1315, a motion sensor 1325, a proximity sensor 1335, a light sensor 1345, and the like. The location processor 1315 is used for positioning a geographic location of the mobile device 1300 and may be a GPS receiver. The motion sensor 1325 may include one or more accelerometers, configured to determine change of the mobile device 1300 in a movement speed and a movement direction. The proximity sensor 1335 is used for probing an object near the mobile device 1300 in a manner of no physical contact. The light sensor 1345 is used for detecting light.

In one embodiment of the present disclosure, the peripheral interface 1303 may be connected to a wireless communications subsystem 1355, configured to support the mobile device 1300 to implement wireless communication. The wireless communications subsystem 1355 may include: a radio frequency transceiver and/or an optical transceiver (such as an infrared transceiver). In one embodiment of the present disclosure, the wireless communications subsystem 1355 may be accessed to different types of communications networks such as a GSM network, a GPRS network, a 3G network, a 4G network, a 5G network, Wi-Fi, and Bluetooth.

In one embodiment of the present disclosure, the peripheral interface 1303 may be connected to a camera subsystem 1365 and an optical sensor 1375 for implementing camera functions, such as taking photos or recording a video. In one embodiment of the present disclosure, the optical sensor 1375 may be a charged coupled device (CCD) optical sensor, a complementary metal-oxide semiconductor (CMOS) optical sensor, or the like.

In one embodiment of the present disclosure, the peripheral interface 1303 may be connected to an audio subsystem 1385, a speaker 1395, and a microphone 13105, configured to implement functions related to voices, such as voice recognition, recording, and making of telephone calls. In one embodiment of the present disclosure, the audio subsystem 1385 may receive a voice instruction sent by a user using the mobile device 1300.

In one embodiment of the present disclosure, the peripheral interface 1303 may be connected to an I/O subsystem 13115, configured to support various input and output devices. In one embodiment of the present disclosure, the I/O subsystem 13115 includes a touchscreen controller 13125, configured to connect to a touchscreen 13135. The touchscreen controller 13125 and the touchscreen 13135 detect a touch condition, contact movement, stopping of touching, and the like based on a touch sensitive technology. In one embodiment of the present disclosure, the touch sensitive technology includes: technologies such as a capacitor, a resistor, infrared rays, and surface acoustic waves. The I/O subsystem 13115 further includes another I/O controller 13145, configured to connect to another I/O device 13155. In one embodiment of the present disclosure, the another I/O device 13155 includes an infrared interface, a USB interface, and the like.

It should be noted that various functions of the mobile device 1300 may be implemented by using hardware and/or software, for example, may be implemented by using one or more signal processing integrated circuits and/or application-specific integrated circuits.

Figure 14:
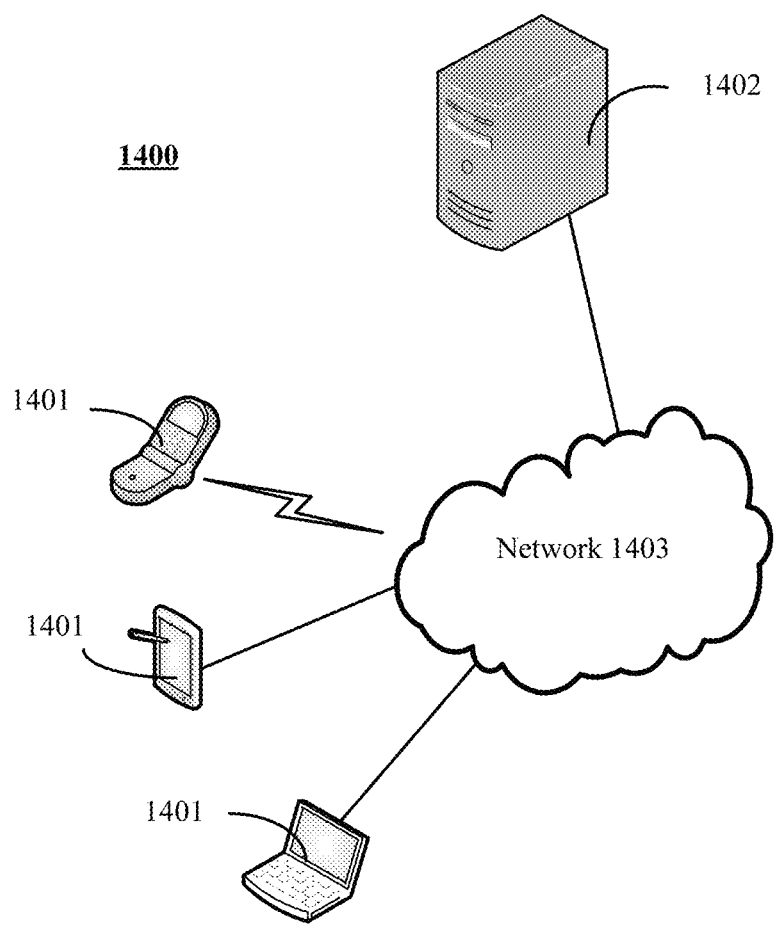
FIG. 14 is a schematic composition diagram of a visual media file transmission system 1400 according to an embodiment of the present disclosure.

FIG. 14 is a schematic composition diagram of a visual media file transmission system 1400 according to an embodiment of the present disclosure. In one embodiment of the present disclosure, the visual media file transmission system 1400 includes: multiple user terminals 1401, a message communication server 1402, and a network 1403.

In one embodiment of the present disclosure, the message communication server 1402 is configured to support message communication between the user terminals 1401. The network 1403 may be different types of communications network such as a GSM network, a GPRS network, a 3G network, a 4G network, a 5G network, Wi-Fi, and Bluetooth and a combination of the communications network.

In one embodiment of the present disclosure, the user terminal 1401 may implement the functions in FIG. 1 to FIG. 13. Further, the user terminal 1401 may send a user behavior related to media transmission to the message communication server 1402. The message communication server 1402 stores the user behavior to a user behavior database, to modify a configuration file set by the message communication server 1402. In one embodiment of the present disclosure, when the message communication server 1402 determines that 60% of user behaviors show that a selection of the user is inconsistent with a judgment that is made by the user terminal 1401 according to the configuration file, a threshold t is added. For example, the judgment that is made by the user terminal 1401 according to the configuration file is to send an original image. When the user is prompted by using the interface shown in FIG. 9, the user selects a "cancel key", which means that the selection of the user is inconsistent with the judgment of the user terminal 1401.

The foregoing descriptions are merely preferred embodiments of this invention, but are not intended to limit the present disclosure. Any modification, equivalent replacement, or improvement made within the spirit and principle of the present disclosure shall fall within the protection scope of the present disclosure.

What is claimed is:

1. A visual media file transmission method, comprising:
monitoring a transmission request for a visual media file;
extracting, when the transmission request is detected, according to a reference value, information related to the visual media file to obtain an analysis result, the information related to the visual media file comprising at least one of: content information of the visual media file or a communication message associated with the visual media file, the reference value including a quantity threshold of human faces, and the analysis result including a result obtained by comparing a quantity of human faces recognized from the visual media file with the quantity threshold; and
determining, based on the analysis result, whether to transmit an original version of the visual media file or a processed version of the visual media file having a smaller size than the original version, comprising:
when the analysis result indicates that the quantity of human faces recognized from the visual media file exceeds the quantity threshold, transmitting the original version of the visual media file; and
when the analysis result indicates that the quantity of human faces recognized from the visual media file does not exceed the quantity threshold, transmitting the processed version of the visual media file.

2. The method according to claim 1, further comprising:
parsing the visual media file to extract the content information of the visual media file; and
obtaining the analysis result by matching the content information and the reference value.

3. The method according to claim 2, further comprising:
obtaining at least one static image comprised in the visual media file; and extracting photo-taking data of the static image;
obtaining an entry related to the reference value from the photo-taking data, and performing content matching on the entry and the reference value or the communication message associated with the visual media file, to obtain the analysis result of whether the entry and the reference value or the communication message associated with the visual media file are matched;
transmitting the processed version of the visual media file when the entry from the photo-taking data is not matched with the reference value or the message content; and
transmitting the original version of the visual media file when the entry from the photo-taking data is matched with the reference value or the message content.

4. The method according to claim 1, further comprising:
determining a message communication process associated with the transmission request and extracting one or more communication messages from the message communication process;
performing keyword filtering on the extracted messages, to obtain the analysis result of whether keywords are matched;
transmitting the original version of the visual media file when the analysis result indicates that the keywords are matched; and
transmitting the processed version of the visual media file when the analysis result indicates that the keywords are not matched.

5. The method according to claim 4, further comprising:
obtaining messages whose time intervals with the transmission request are within a threshold, or obtaining a predetermined quantity of messages before and after the transmission request.

6. The method according to claim 1, further comprising:
obtaining from a message communication server a configuration file in which the reference value is recorded.

7. A user terminal, comprising:
one or more memories; and
one or more processors,
the one or more memories storing one or more instruction modules, configured to be executed by the one or more processors,
the one or more instruction modules comprising:
a message communication unit, configured to monitor a transmission request for a visual media file;
a transmission control unit, configured to extract, when the transmission request is detected, according to a reference value, information related to the visual media file to obtain an analysis result, and determine, based on the analysis result, whether to transmit an original version of the visual media file or a processed version of the visual media file having a smaller size than the original version,
the information related to the visual media file comprising at least one of: content information of the visual media file or a communication message associated with the visual media file, wherein:
the reference value includes a quantity threshold of human faces, and the analysis result includes a result obtained by comparing a quantity of human faces recognized from the visual media file with the quantity threshold; and
the transmission control unit is further configured to:
when the analysis result indicates that the quantity of human faces recognized from the visual media file exceeds the quantity threshold, transmit the original version of the visual media file; and
when the analysis result indicates that the quantity of human faces recognized from the visual media file does not exceed the quantity threshold, transmit the processed version of the visual media file.

8. The user terminal according to claim 7, wherein the transmission control unit comprises:
a parsing module, configured to parse the visual media file to extract the content information of the visual media file; and
a matching module, configured to obtain the analysis result by matching the content information and the reference value.

9. The user terminal according to claim 8, wherein the parsing module is configured to: obtain at least one static image comprised in the visual media file, and extract photo-taking data of the static image;
the matching module is configured to: obtain an entry related to the reference value from the photo-taking data, and perform content matching on the entry and the reference value or the communication message associated with the visual media file, to obtain the analysis result of whether the entry and the reference value or the communication message associated with the visual media file are matched; and
the transmission control unit is further configured to:
transmit the processed version of the visual media file when the entry from the photo-taking data is not matched with the reference value or the message content; and
transmit the original version of the visual media file when the entry from the photo-taking data is matched with the reference value or the message content.

10. The user terminal according to claim 7, wherein the transmission control unit comprises:
a message extraction module, configured to determine a message communication process associated with the transmission request and extract one or more communication messages from the message communication process; and
a keyword filtering module, configured to perform keyword filtering on the extracted messages, to obtain the analysis result of whether keywords are matched; and
the transmission control unit is further configured to:
transmit the original version of the visual media file when the analysis result indicates that the keywords are matched; and
transmit the processed version of the visual media file when the analysis result indicates that the keywords are not matched.

11. The user terminal according to claim 10, wherein the message extraction module is configured to: obtain messages whose time intervals with the transmission request are within a threshold, or obtain a predetermined quantity of messages before and after the transmission request.

12. The user terminal according to claim 7, wherein the transmission control unit is further configured to: obtain from a message communication server a configuration file in which the reference value is recorded.

13. A non-transitory computer readable storage medium, storing computer readable instructions, when executed by one or more processors, the computer readable instructions performing the following operations:
monitoring a transmission request for a visual media file;
extracting, when the transmission request is detected, according to a reference value, information related to the visual media file to obtain an analysis result, the information related to the visual media file comprising at least one of: content information of the visual media file or a communication message associated with the visual media file, the reference value including a quantity threshold of human faces, and the analysis result including a result obtained by comparing a quantity of human faces recognized from the visual media file with the quantity threshold; and
determining, based on the analysis result, whether to transmit an original version of the visual media file or a processed version of the visual media file having a smaller size than the original version, comprising:
when the analysis result indicates that the quantity of human faces recognized from the visual media file exceeds the quantity threshold, transmitting the original version of the visual media file; and
when the analysis result indicates that the quantity of human faces recognized from the visual media file does not exceed the quantity threshold, transmitting the processed version of the visual media file.

14. The non-transitory computer readable storage medium according to claim 13, when executed by one or more processors, the computer readable instructions further performing the following operations:
parsing the visual media file to extract the content information of the visual media file; and
obtaining the analysis result by matching the content information and the reference value.

15. The non-transitory computer readable storage medium according to claim 14, when executed by one or more processors, the computer readable instructions further performing the following operations:
obtaining at least one static image comprised in the visual media file; and extracting photo-taking data of the static image;
obtaining an entry related to the reference value from the photo-taking data, and performing content matching on the entry and the reference value or the communication message associated with the visual media file, to obtain the analysis result of whether the entry and the reference value or the communication message associated with the visual media file are matched; and
transmitting the processed version of the visual media file when the entry from the photo-taking data is not matched with the reference value or the message content; and
transmitting the original version of the visual media file when the entry from the photo-taking data is matched with the reference value or the message content.

16. The non-transitory computer readable storage medium according to claim 13, when executed by one or more processors, the computer readable instructions further performing:
determining a message communication process associated with the transmission request and extracting one or more communication messages from the message communication process;

performing keyword filtering on the extracted messages, to obtain the analysis result of whether keywords are matched;

transmitting the original version of the visual media file when the analysis result indicates that the keywords are matched; and transmitting the processed version of the visual media file when the analysis result indicates that the keywords are not matched.

17. The non-transitory computer readable storage medium according to claim 16, when executed by one or more processors, the computer readable instructions further performing:

obtaining messages whose time intervals with the transmission request are within a threshold, or obtaining a predetermined quantity of messages before and after the transmission request.

18. The non-transitory computer readable storage medium according to claim 16, when executed by one or more processors, the computer readable instructions further performing:

obtaining from a message communication server a configuration file in which the reference value is recorded.

* * * * *